US012761779B2

(12) United States Patent
Kuppersmith et al.

(10) Patent No.: US 12,761,779 B2
(45) Date of Patent: Oct. 13, 2026

(54) SPATIAL QUICK-ACCESS MESSAGING SYSTEM FOR WEARABLE DEVICES

(71) Applicant: snap Inc., Santa Monica, CA (US)

(72) Inventors: Mitchell Kuppersmith, Los Angeles, CA (US); Karen Stolzenberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/818,204

(22) Filed: Aug. 28, 2024

(65) Prior Publication Data

US 2026/0064252 A1 Mar. 5, 2026

(51) Int. Cl.

| | |
|---|---|
| ***G06F 3/04842*** | (2022.01) |
| ***G06Q 10/40*** | (2026.01) |
| ***G06T 19/00*** | (2011.01) |
| ***G06V 40/20*** | (2022.01) |
| ***H04L 51/224*** | (2022.01) |

(52) U.S. Cl.

CPC ......... *G06F 3/04842* (2013.01); *G06Q 10/40* (2026.01); *G06T 19/006* (2013.01); *G06V 40/28* (2022.01); *H04L 51/224* (2022.05)

(58) Field of Classification Search

CPC ... G06F 3/04842; G06V 40/28; H04L 51/224; G06Q 50/01; G06T 19/006

See application file for complete search history.

(56) References Cited

U.S. PATENT DOCUMENTS

| | | | | |
|---|---|---|---|---|
| 11,531,402 B1 * | 12/2022 | Stolzenberg | ........ | G06F 3/04847 |
| 2008/0133580 A1 * | 6/2008 | Wanless | .............. | H04L 61/4594 707/999.102 |

(Continued)

FOREIGN PATENT DOCUMENTS

| | | | |
|---|---|---|---|
| CN | 114327031 A * | | 4/2022 |
| EP | 3699736 | | 3/2023 |

OTHER PUBLICATIONS

"International Application Serial No. PCT US2025 042528, International Search Report mailed Dec. 3, 2025", 4 pgs.

(Continued)

*Primary Examiner* — Stephen G Sherman

(74) *Attorney, Agent, or Firm* — Schwegman Lundberg & Woessner, P.A.

(57) ABSTRACT

A wearable augmented reality device enables rapid, personalized messaging through a body-anchored communication interface. The device captures image data via cameras, detects and tracks a body part of the wearer, and displays a user interface anchored to the detected body part. The interface comprises user interface elements representing social connections. Upon detecting selection of an element, the device activates a microphone to record an audio message for delivery to the corresponding social connection(s). The interface may be dynamically updated to reflect changes in relationship attributes, messaging activity, or connection status. User interface elements can be ordered based on social connection scores or communication recency, with additional graphical elements indicating device types or custom avatars. This system facilitates seamless integration of digital communication with the physical world, enhancing social media and instant messaging experiences in mixed reality environments.

18 Claims, 11 Drawing Sheets

(56) References Cited

U.S. PATENT DOCUMENTS

| | | | | |
|---|---|---|---|---|
| 2015/0205397 | A1* | 7/2015 | Wang | H04M 1/724 345/173 |
| 2016/0231888 | A1* | 8/2016 | Govindraj | G06F 3/04842 |
| 2019/0089825 | A1* | 3/2019 | Scott | H04M 3/53391 |
| 2021/0191600 | A1 | 6/2021 | Lemay et al. | |
| 2022/0319134 | A1 | 10/2022 | Rodrigues et al. | |
| 2023/0280883 | A1 | 9/2023 | Kocienda et al. | |
| 2024/0127705 | A1* | 4/2024 | Blahnik | G09B 5/02 |

OTHER PUBLICATIONS

"International Application Serial No. PCT US2025 042528, Written Opinion mailed Dec. 3, 2025", 7 pgs.

* cited by examiner

SPATIAL QUICK-ACCESS MESSAGING SYSTEM FOR WEARABLE DEVICES

TECHNICAL FIELD

The present disclosure relates generally to augmented reality (AR) communication systems, and more specifically to body-anchored communication interfaces for wearable AR devices. The disclosed technology enables rapid, personalized messaging through virtual interfaces mapped to a user's body or surroundings, facilitating seamless integration of digital communication with the physical world. This field encompasses AR spectacles, spatial computing, computer vision, gesture recognition, and voice-based messaging systems designed to enhance social media and instant messaging experiences in mixed reality environments.

BACKGROUND

Spatial computing represents a paradigm shift in how we interact with digital information, moving beyond traditional two-dimensional interfaces to create immersive experiences that blend seamlessly with our physical environment. This emerging field encompasses Augmented Reality ("AR"), Mixed Reality ("MR"), and Extended Reality ("XR") technologies, which integrate computer-generated content with the real world. AR overlays digital information onto the user's view of the physical environment, while MR allows digital objects to interact with the real world in real-time. XR, an umbrella term, includes both AR and MR, as well as fully immersive Virtual Reality ("VR") experiences.

These technologies leverage advanced sensors, cameras, and displays to track the user's environment and create convincing spatial illusions. Users can interact with digital content in natural and intuitive ways, such as using hand gestures to manipulate virtual objects or exploring three dimensional ("3D") visualizations. Recent advancements have led to the development of head-mounted displays, smart glasses, and other wearable computing devices capable of delivering AR/MR/XR experiences. These devices incorporate sophisticated hardware to seamlessly blend digital content with the real world.

The input and output mechanisms of spatial computing devices differ significantly from traditional computing devices. Instead of relying solely on touchscreens or keyboards, they often utilize gesture recognition, voice commands, eye tracking, and spatial awareness for user interactions. Output is no longer confined to a two-dimensional screen but can be projected into the three-dimensional space around the user. As a result, conventional applications and user interfaces do not easily translate to spatial computing devices, often resulting in suboptimal user experiences that fail to take advantage of their unique capabilities.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
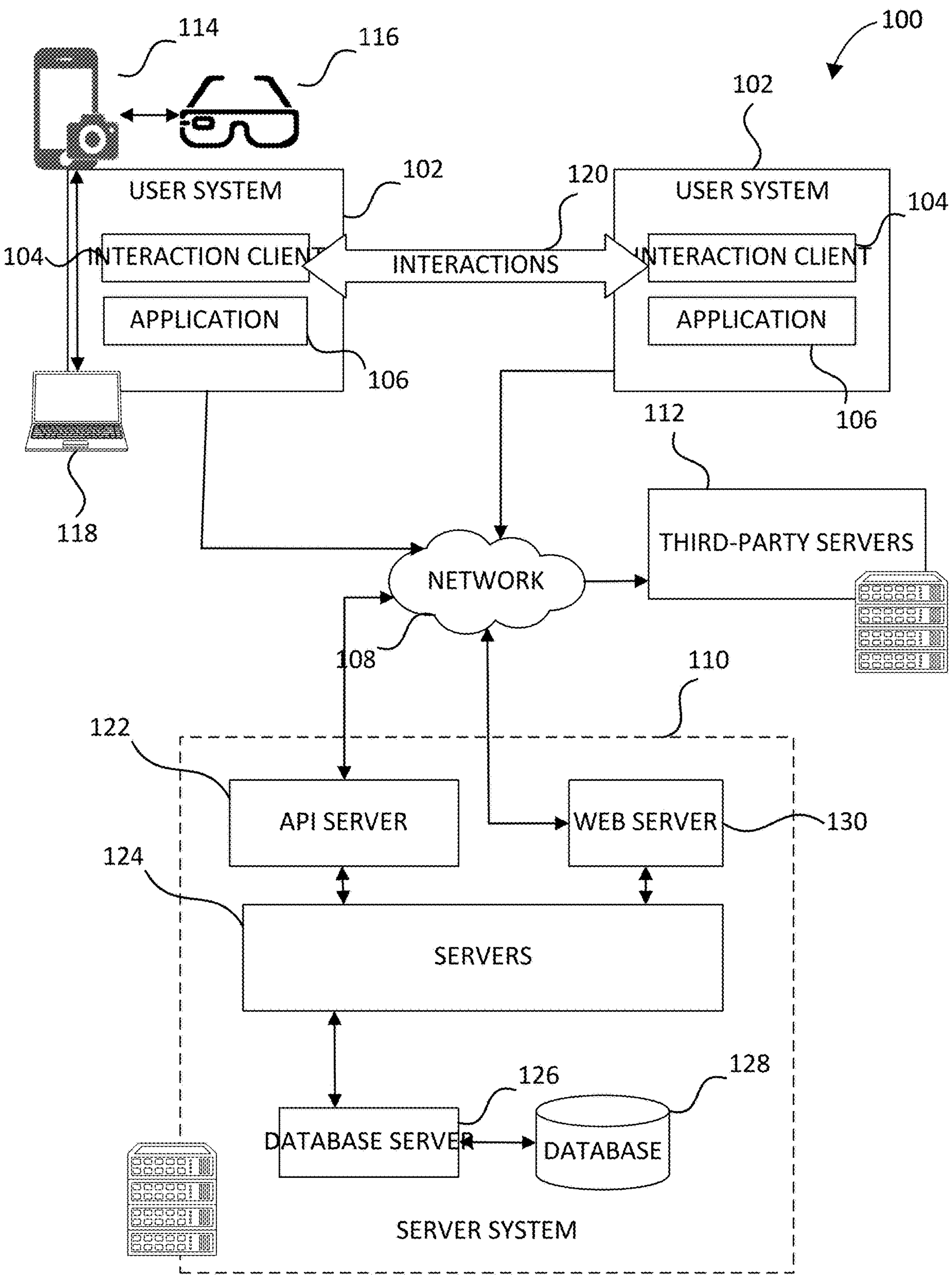
FIG. 1 is a diagrammatic representation of a networked environment in which the present disclosure may be deployed, according to some examples.

The present disclosure describes systems and methods for enhancing messaging and social interactions through augmented reality (AR) devices, particularly focusing on body-anchored communication interfaces. By leveraging the unique capabilities of AR and spatial computing, the disclosed techniques create more intuitive, immersive, and personalized user experiences for messaging applications. The following detailed description provides various embodiments of these systems and methods, including body-anchored user interfaces, rapid voice messaging, and context-aware social interactions in AR environments.

Current messaging applications face significant technical challenges when adapted for AR environments. Traditional two-dimensional interfaces fail to leverage the full potential of AR devices, resulting in suboptimal user experiences. The technical problem lies in effectively representing and interacting with digital content, such as social connections and messages, in three-dimensional space while maintaining usability and efficiency. Moreover, existing systems lack the capability to seamlessly integrate digital communications with the user's physical body and environment, limiting the contextual relevance and personal nature of interactions.

Additionally, AR devices introduce unique technical constraints, such as the need for hands-free interaction, potential visual clutter, and the challenge of input methods in spatial environments. These constraints further complicate the design and implementation of effective messaging applications in AR. A significant challenge lies in creating intuitive, quick-access interfaces that don't rely on traditional input methods like keyboards or touch screens. The technical challenge extends to developing efficient algorithms for real-time body part detection, tracking, and content anchoring that can operate within the computational limitations of wearable AR devices while ensuring optimal and non-intrusive positioning of digital elements in the user's field of view.

To address these technical challenges, the present disclosure proposes techniques, including systems and methods, that leverage the advanced capabilities of AR devices. These approaches utilize computer vision algorithms, voice recognition, and spatial awareness technologies to create immersive, body-anchored user interfaces for messaging and social interactions. By reimagining how users interact with digital content and social connections in AR environments, the proposed solutions offer several technical advantages.

One technical advantage is the ability to anchor digital content, such as user interface elements representing social connections, to specific parts of the user's body, such as the arm or wrist, leg, or other body parts. This is achieved through advanced computer vision techniques for body part detection and tracking, allowing for more intuitive and personalized message access. For example, a user can quickly send a voice message to a close friend by interacting with a virtual button anchored to their wrist, enhancing the efficiency and intimacy of communication.

Another technical advantage lies in the development of visualization techniques for representing social connections in three-dimensional space anchored to the user's body. By utilizing the user's arm, for example, as a natural interface, these methods create more engaging and informative representations of social networks. This approach not only maximizes the use of available interaction space in AR environments but also provides users with intuitive visual cues about the nature and importance of their social connections based on their positioning relative to the body.

Furthermore, the proposed systems incorporate advanced input recognition algorithms that can interpret gestures and voice commands, enabling more natural and efficient interactions with body-anchored content. These input methods are complemented by context-aware content delivery systems that can dynamically update the user interface based on relationship attributes, messaging activity, and connection status, ensuring that the most relevant information is always readily accessible.

By addressing these technical challenges and leveraging the unique capabilities of AR devices, the disclosed systems and methods create messaging applications that offer more immersive, efficient, and personally relevant communication experiences. These solutions not only enhance the functionality of AR devices but also pave the way for new forms of digital interaction that are more closely integrated with users'physical bodies and personal relationships. These and other advantages will be readily apparent from the detailed description of the several figures that follows.

Networked Computing Environment

FIG. 1 is a block diagram showing an example digital interaction system 100 for facilitating interactions and engagements (e.g., exchanging text messages, conducting text audio and video calls, or playing games) over a network. The digital interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), a server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages. Consistent with some examples, the user system 102 may include a head-wearable apparatus 116, such as augmented reality (AR) spectacles, smart glasses, or other wearable AR devices. The head-wearable apparatus 116 includes at least one camera for capturing image data, a display for presenting AR content, a microphone for recording audio messages, a speaker for presenting audible sounds, and a processor for executing the interaction client 104

An interaction client 104 interacts with other interaction clients 104 and with the server system 110 via the network 108. The data exchanged between the interaction clients 104 (e.g., interactions 120) and between the interaction clients 104 and the server system 110 includes functions (e.g., commands to invoke functions) and payload data (e.g., text, audio, video, or other multimedia data). Consistent with some examples, the interaction client 104 on the head-wearable apparatus 116 is configured to process image data captured by the camera to detect and track body parts of the user wearing the device. The interaction client 104 displays a user interface anchored to the detected body part via the display of the head-wearable apparatus 116. The user interface displayed on the head-wearable apparatus 116 comprises a plurality of user interface elements, where each element represents a social connection or a group of social connections. These elements may be ordered based on relationship attributes such as social connection scores or communication recency. The interaction client 104 on the head-wearable apparatus 116 is capable of detecting user selections of the user interface elements. Upon detecting a selection, the interaction client 104 activates the microphone to record an audio message. The recorded audio message is communicated via the network 108 to the server system 110 for delivery to the selected social connection or group of social connections. This communication may involve the API server 122 and the servers 124. The interaction client 104 on the head-wearable apparatus 116 is capable of updating the user interface in real-time to reflect changes in relationship attributes, messaging activity, presence status, and activity status of social connections. These updates may be based on data received from the server system 110. Each user interface element may include additional graphical elements indicating the type of device being used by the corresponding social connection, or an avatar configured by the person represented by the user interface element. This information may be stored in and retrieved from the database 128 via the database server 126.

The server system 110 provides server-side functionality via the network 108 to the interaction clients 104. While certain functions of the digital interaction system 100 are described herein as being performed by either an interaction client 104 or by the server system 110, the location of certain functionality either within the interaction client 104 or the server system 110 may be a design choice. For example, it may be technically preferable to initially deploy particular technology and functionality within the server system 110 but to later migrate this technology and functionality to the interaction client 104 where a user system 102 has sufficient processing capacity.

The server system 110 supports various services and operations that are provided to the interaction clients 104.

Such operations include transmitting data to, receiving data from, and processing data generated by the interaction clients 104. This data may include message content, client device information, geolocation information, digital effects (e.g., media augmentation and overlays), message content persistence conditions, entity relationship information, and live event information. Data exchanges within the digital interaction system 100 are invoked and controlled through functions available via user interfaces (UIs) of the interaction clients 104.

Turning now specifically to the server system 110, an Application Program Interface (API) server 122 is coupled to and provides programmatic interfaces to servers 124, making the functions of the servers 124 accessible to interaction clients 104, other applications 106 and third-party server 112. The servers 124 are communicatively coupled to a database server 126, facilitating access to a database 128 that stores data associated with interactions processed by the servers 124. Similarly, a web server 130 is coupled to the servers 124 and provides web-based interfaces to the servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the servers 124. The Application Program Interface (API) server 122 exposes various functions supported by the servers 124, including account registration; login functionality; the sending of interaction data, via the servers 124, from a particular interaction client 104 to another interaction client 104; the communication of media files (e.g., images or video) from an interaction client 104 to the servers 124; the settings of a collection of media data (e.g., a narrative); the retrieval of a list of friends of a user of a user system 102; the retrieval of messages and content; the addition and deletion of entities (e.g., friends) to an entity relationship graph (e.g., the entity graph 308); the location of friends within an entity relationship graph; and opening an application event (e.g., relating to the interaction client 104).

The servers 124 host multiple systems and subsystems, described below with reference to FIG. 2.

System Architecture

Figure 2:
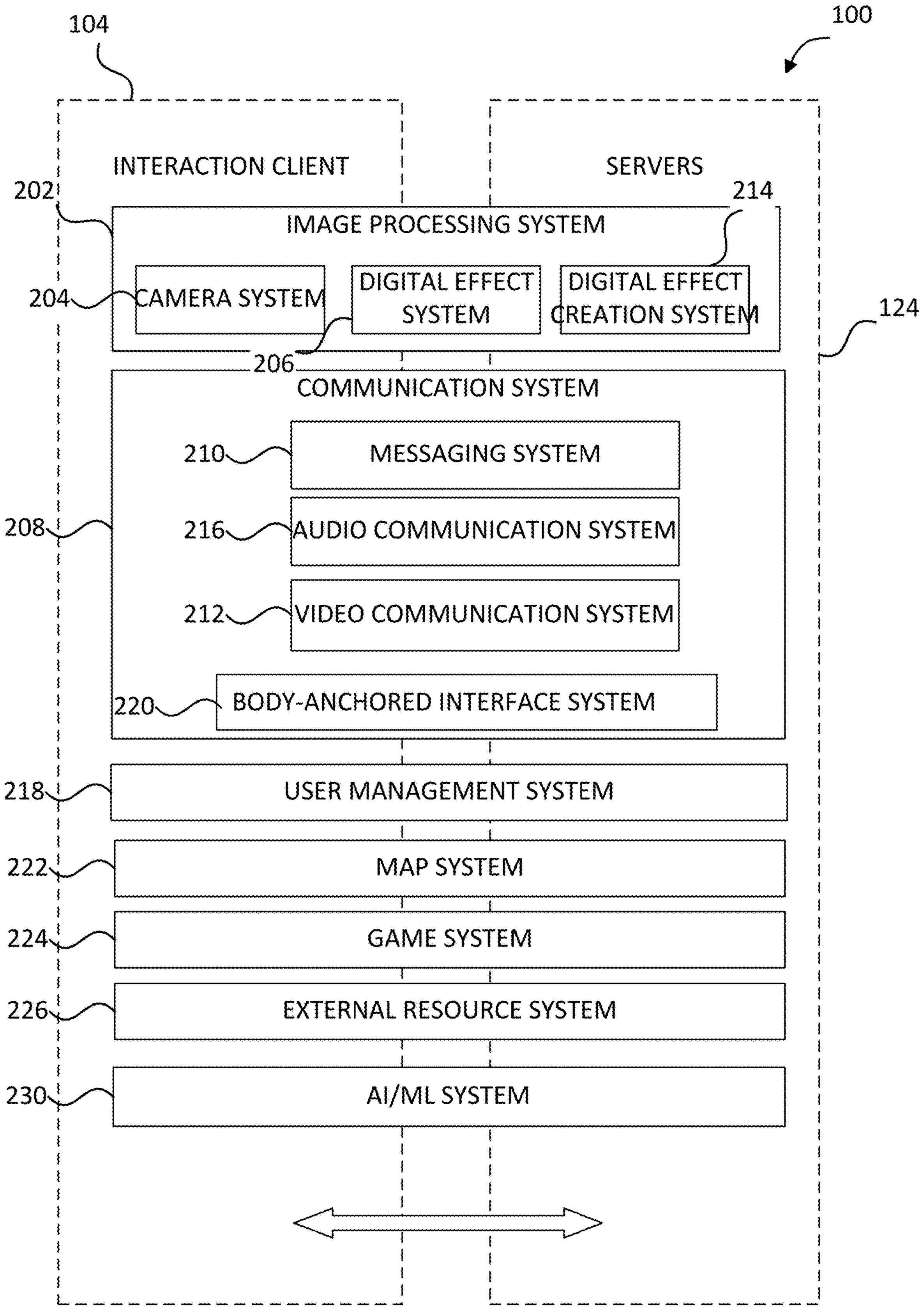
FIG. 2 is a diagrammatic representation of a digital interaction system that has both client-side and server-side functionality, according to some examples.

FIG. 2 is a block diagram illustrating further details regarding the digital interaction system 100, according to some examples. Specifically, the digital interaction system 100 is shown to comprise the interaction client 104 and the servers 124. The digital interaction system 100 embodies multiple subsystems, which are supported on the client-side by the interaction client 104 and on the server-side by the servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the digital interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the digital interaction system 100.

Service discovery: Microservice subsystems may find and communicate with other microservice subsystems of the digital interaction system 100. Service discovery mechanisms enable microservice subsystems to locate and communicate with other microservice subsystems in a scalable and efficient way.

Monitoring and logging: Microservice subsystems may need to be monitored and logged to ensure availability and performance. Monitoring and logging mechanisms enable the tracking of health and performance of a microservice subsystem.

In some examples, the digital interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and modify (e.g., augment, annotate or otherwise edit) media content associated with a message.

A camera system 204 includes control software (e.g., in a camera application) that interacts with and controls hardware camera hardware (e.g., directly or via operating system controls) of the user system 102 to modify real-time images captured and displayed via the interaction client 104. In the context of the head-wearable apparatus 116, the camera system 204 is utilized by the body-anchored interface system 220 to capture image data for body part detection and tracking.

The digital effect system 206 provides functions related to the generation and publishing of digital effects (e.g., media overlays) for images captured in real-time by cameras of the user system 102 or retrieved from memory of the user system 102. For example, the digital effect system 206 operatively selects, presents, and displays digital effects (e.g., media overlays such as image filters or modifications) to the interaction client 104 for the modification of real-time images received via the camera system 204 or stored images retrieved from memory 502 of a user system 102. These digital effects are selected by the digital effect system 206 and presented to a user of an interaction client 104, based on a number of inputs and data, such as for example:

Geolocation of the user system 102; and

Entity relationship information of the user of the user system 102.

Digital effects may include audio and visual content and visual effects. Examples of audio and visual content include pictures, texts, logos, animations, and sound effects. Examples of visual effects include color overlays and media overlays. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The digital effect creation system 214 supports augmented reality developer platforms and includes an application for content creators (e.g., artists and developers) to create and publish digital effects (e.g., augmented reality experiences) of the interaction client 104. The digital effect creation system 214 provides a library of built-in features and tools to content creators including, for example custom shaders, tracking technology, and templates.

In some examples, the digital effect creation system 214 provides a merchant-based publication platform that enables merchants to select a particular digital effect associated with a geolocation via a bidding process. For example, the digital effect creation system 214 associates a media overlay of the highest bidding merchant with a corresponding geolocation for a predefined amount of time.

A communication system 208 is responsible for enabling and processing multiple forms of communication and interaction within the digital interaction system 100 and includes a messaging system 210, an audio communication system 216, and a video communication system 212. The messaging system 210 is responsible, in some examples, for enforcing the temporary or time-limited access to content by the interaction clients 104. The messaging system 210 incorporates multiple timers that, based on duration and display parameters associated with a message or collection of messages (e.g., a narrative), selectively enable access (e.g., for presentation and display) to messages and associated content via the interaction client 104. The audio communication system 216 enables and supports audio communications (e.g., real-time audio chat) between multiple interaction clients 104. In the context of the body-anchored interface, the audio communication system 216 is responsible for recording and transmitting voice messages initiated through the body-anchored interface. Similarly, the video communication system 212 enables and supports video communications (e.g., real-time video chat) between multiple interaction clients 104.

A body-anchored interface system 220 is responsible for implementing the body-anchored communication interface on the head-wearable apparatus 116. This system utilizes computer vision algorithms to detect and track body parts of the user, and manages the display and interaction with user interface elements anchored to these body parts. The body-anchored interface system 220 works in conjunction with the image processing system 202, the camera system 204, and the artificial intelligence and machine learning system 230 to provide a seamless and intuitive user experience.

A user management system 218 is operationally responsible for the management of user data and profiles, and maintains entity information (e.g., stored in entity tables 306, entity graphs 308 and profile data 302) regarding users and relationships between users of the digital interaction system 100. In the context of the body-anchored interface, the user management system 218 is responsible for managing and updating relationship attributes, such as social connection scores and communication recency, which are used to determine the order and positioning of user interface elements in the body-anchored interface.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the digital interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the digital interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the digital interaction system 100. The digital interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the servers 124. The SDK includes Application Programming Interfaces (APIs) with functions that can be called or invoked by the web-based application. The servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to servers 124. The servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An artificial intelligence and machine learning system 230 provides a variety of services to different subsystems within the digital interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the digital effect system 206 to generate modified content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. In the context of the body-anchored interface, the artificial intelligence and machine learning system 230 is utilized for real-time body part detection and tracking, as well as for dynamically updating the user interface based on user interactions and relationship data. The artificial intelligence and machine learning system 230 may also provide chatbot functionality to message interactions 120 between user systems 102 and between a user system 102 and the server system 110. The artificial intelligence and machine learning system 230 may also work with the audio communication system 216 to provide speech recognition and natural language processing capabilities, allowing users to interact with the digital interaction system 100 using voice commands, which is particularly relevant for the voice messaging functionality of the body-anchored interface.

Data Architecture

Figure 3:
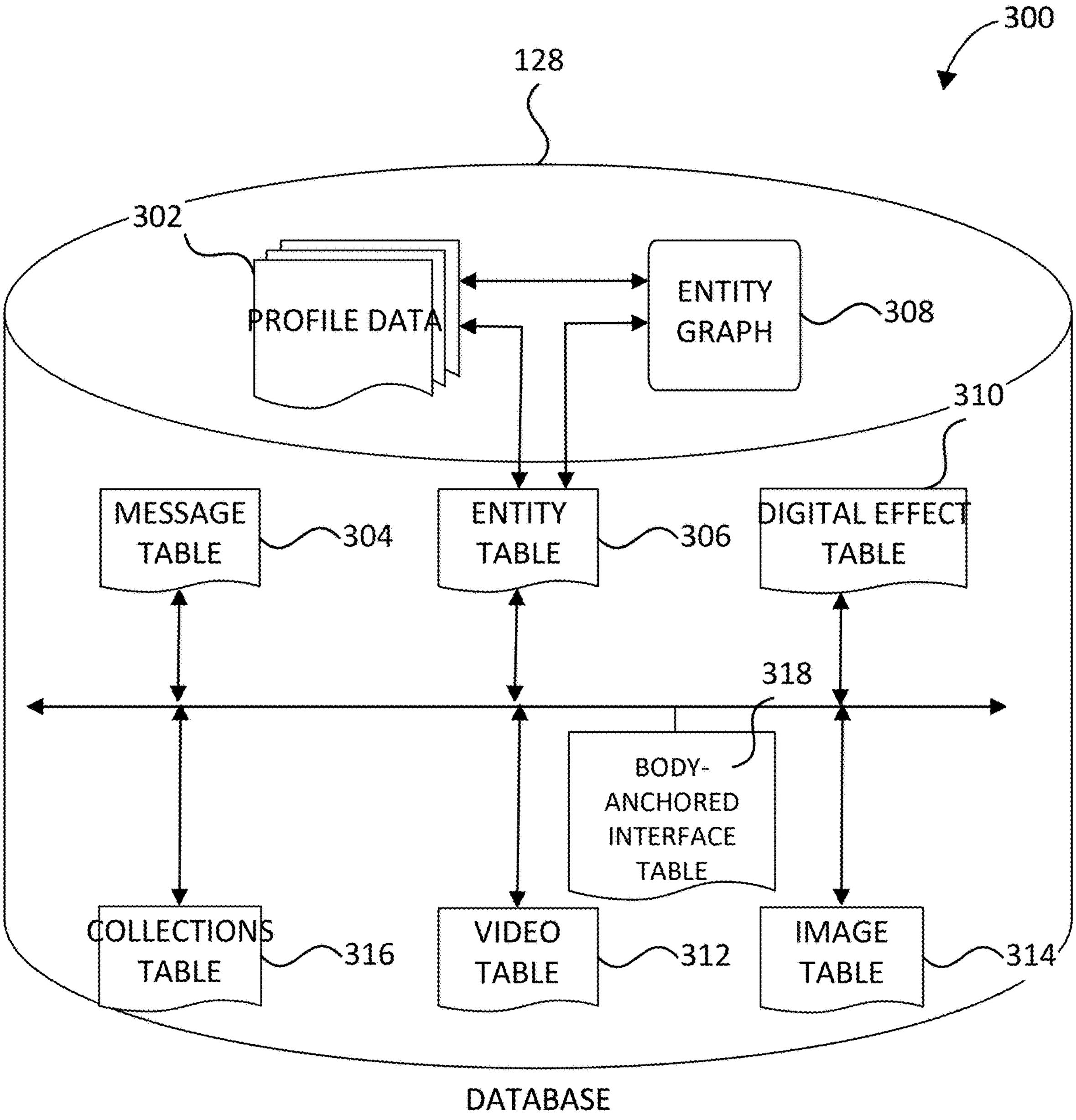
FIG. 3 is a diagrammatic representation of a data structure as maintained in a database, according to some examples.

FIG. 3 is a schematic diagram illustrating data structures 300, which may be stored in the database 128 of the server system 110, according to certain examples. While the content of the database 128 is shown to comprise multiple tables, it will be appreciated that the data could be stored in other types of data structures (e.g., as an object-oriented database).

The database 128 includes message data stored within a message table 304. This message data includes at least message sender data, message recipient (or receiver) data, and a payload. Further details regarding information that may be included in a message, and included within the message data stored in the message table 304, are described below with reference to FIG. 3. For example, for messages sent through the body-anchored interface, the message data may include information about the body part to which the message is to be anchored.

An entity table 306 stores entity data, and is linked (e.g., referentially) to an entity graph 308 and profile data 302. Entities for which records are maintained within the entity table 306 may include individuals, corporate entities, organizations, objects, places, events, and so forth. Regardless of entity type, any entity regarding which the server system 110 stores data may be a recognized entity. Each entity is provided with a unique identifier, as well as an entity type identifier (not shown). For users of the head-wearable apparatus 116, the entity table 306 also stores data related to the user's preferred body-anchored interface settings and configurations.

The entity graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the digital interaction system 100.

Certain permissions and relationships may be attached to each relationship, and to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 306. Such privacy settings may be applied to all types of relationships within the context of the digital interaction system 100, or may selectively be applied to certain types of relationships.

The profile data 302 stores multiple types of profile data about a particular entity. The profile data 302 may be selectively used and presented to other users of the digital interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the digital interaction system 100, and on map interfaces displayed by interaction clients 104 to other users. The collection of avatar representations may include "status avatars," which present a graphical representation of a status or activity that the user may select to communicate at a particular time. For users of the head-wearable apparatus 116, the profile data 302 includes additional information related to the body-anchored interface, such as preferred arm for interface display and customized ordering of social connections. The profile data 302 also stores social connection scores, which indicate the strength of connection between users and are used to determine the positioning of user interface elements in the body-anchored interface.

Where the entity is a group, the profile data 302 for the group may similarly include one or more avatar representations associated with the group, in addition to the group name, members, and various settings (e.g., notifications) for the relevant group.

The database 128 also includes a body-anchored interface table 318, which stores data specific to the body-anchored communication interface. This table includes information such as user preferences for interface positioning, historical data on user interactions with the interface, and real-time data on the current state of each user's body-anchored interface. The body-anchored interface table 318 is linked to the entity table 306 and is used by the body-anchored interface system 231 to provide a personalized and efficient user experience.

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other digital effect data that may be stored within the image table 314 includes augmented reality content items (e.g., corresponding to augmented reality experiences). An augmented reality content item may be a real-time special effect and sound that may be added to an image or a video.

A collections table 316 stores data regarding collections of messages and associated image, video, or audio data, which are compiled into a collection (e.g., a narrative or a gallery). The creation of a particular collection may be initiated by a particular user (e.g., each user for which a record is maintained in the entity table 306). A user may create a "personal collection" in the form of a collection of content that has been created and sent/broadcast by that user. To this end, the user interface of the interaction client 104 may include an icon that is user-selectable to enable a sending user to add specific content to his or her personal narrative.

A collection may also constitute a "live collection," which is a collection of content from multiple users that is created manually, automatically, or using a combination of manual and automatic techniques. For example, a "live collection" may constitute a curated stream of user-submitted content from various locations and events. Users whose client devices have location services enabled and are at a common location event at a particular time may, for example, be presented with an option, via a user interface of the interaction client 104, to contribute content to a particular live collection. The live collection may be identified to the user by the interaction client 104, based on his or her location.

A further type of content collection is known as a "location collection," which enables a user whose user system 102 is located within a specific geographic location (e.g., on a college or university campus) to contribute to a particular collection. In some examples, a contribution to a location collection may employ a second degree of authentication to verify that the end-user belongs to a specific organization or other entity (e.g., is a student on the university campus).

As mentioned above, the video table 312 stores video data that, in some examples, is associated with messages for which records are maintained within the message table 304. Similarly, the image table 314 stores image data associated with messages for which message data is stored in the entity table 306. The entity table 306 may associate various digital effects from the digital effect table 310 with various images and videos stored in the image table 314 and the video table 312.

Data Communications Architecture

Figure 4:
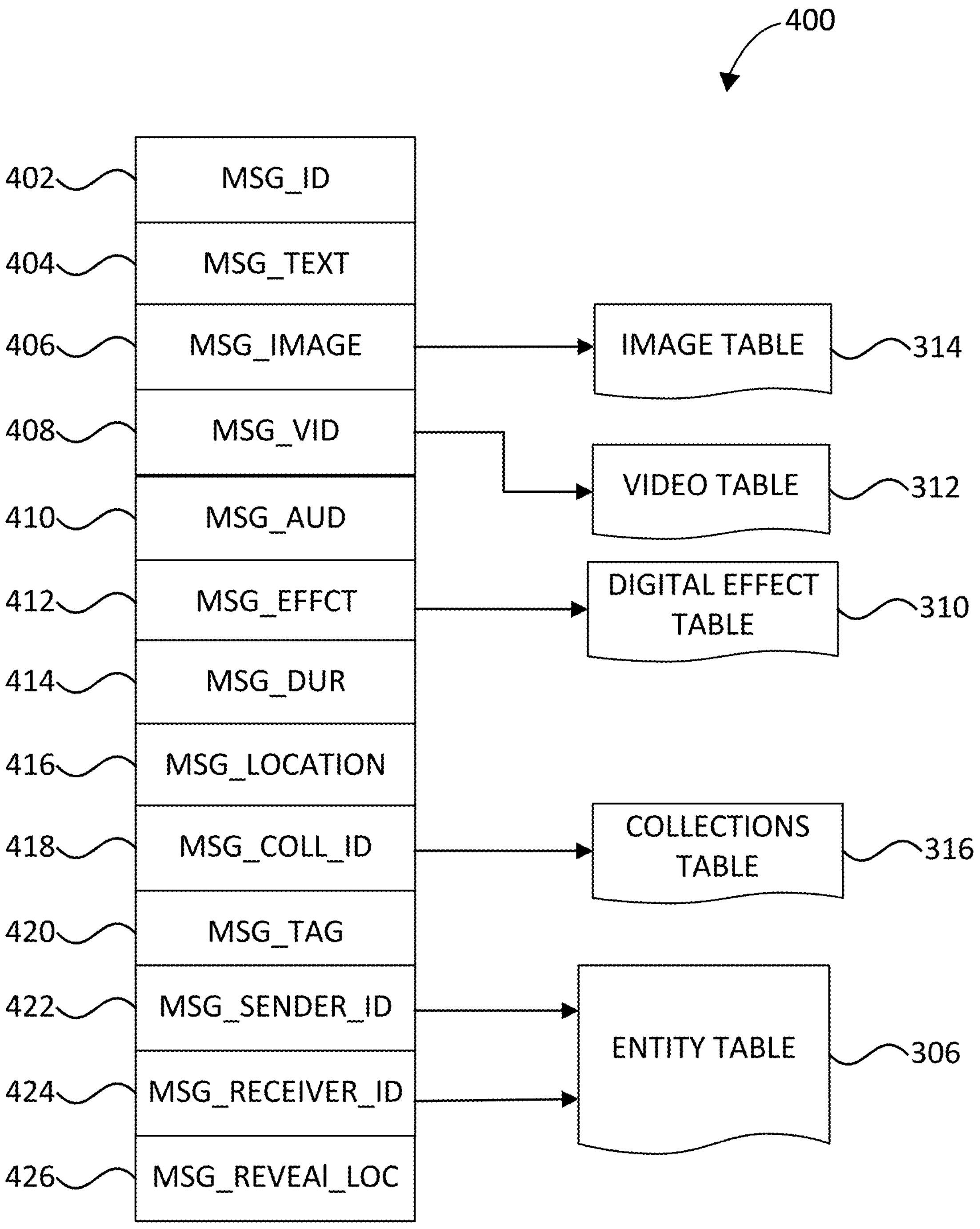
FIG. 4 is a diagrammatic representation of a message, according to some examples.

FIG. 4 is a schematic diagram illustrating a structure of a message 400, according to some examples, generated by an interaction client 104 for communication to a further interaction client via the servers 124. The content of a particular message 400 is used to populate the message table 304 stored within the database 128, accessible by the servers 124. Similarly, the content of a message 400 is stored in memory as "in-transit" or "in-flight" data of the user system 102 or the servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 314.
- Message video payload 408: video data, captured by a camera component or retrieved from a memory component of the user system 102, and that is included in the message 400. Video data for a sent or received message 400 may be stored in the video table 312.
- Message audio payload 410: audio data, captured by a microphone or retrieved from a memory component of the user system 102, and that is included in the message 400. For messages sent through the body-anchored interface, this may include voice messages recorded using the head-wearable apparatus 116.
- Message digital effect data 412: digital effect data (e.g., filters, stickers, or other annotations or enhancements) that represents digital effects to be applied to message image payload 406, message video payload 408, or message audio payload 410 of the message 400. Digital effect data for a sent or received message 400 may be stored in the digital effect table 310.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal, and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message collection identifier 418: identifier values identifying one or more content collections (e.g., "stories" identified in the collections table 316) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.
- Message reveal location 426: data indicating the specific body part or location where the message or user interface should be displayed or presented when using the body-anchored interface on the head-wearable apparatus 116. This may include coordinates or identifiers for body parts such as the wrist, arm, or hand. For messages sent through the body-anchored interface, values stored within the message reveal location 426 may point to data stored in the body-anchored interface table 318, which contains information about user preferences for interface positioning and spatial context of messages.

The contents (e.g., values) of the various components of message 400 may be pointers to locations in tables within which content data values are stored. For example, an image value in the message image payload 406 may be a pointer to (or address of) a location within an image table 314. Similarly, values within the message video payload 408 may point to data stored within a video table 314, values stored within the message digital effect data 412 may point to data stored in a digital effect table 310, values stored within the message collection identifier 418 may point to data stored in a collections table 316, and values stored within the message sender identifier 422 and the message receiver identifier 424 may point to user records stored within an entity table 306.

Spatial Quick-Access Messaging System

Figure 5:
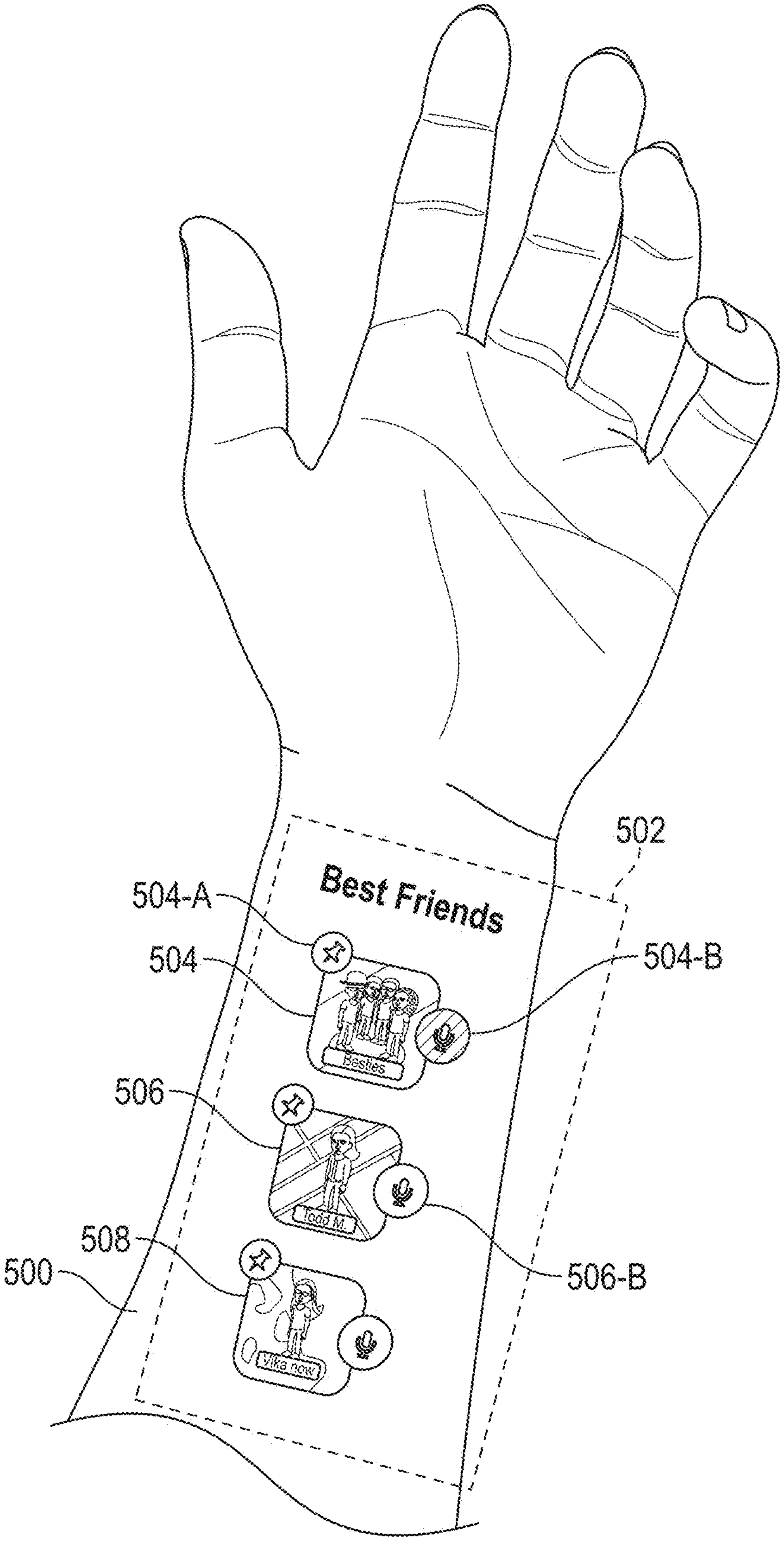
FIG. 5 illustrates a view as seen by a user wearing a head-wearable apparatus, such as augmented reality (AR) spectacles, when interacting with a quick-access or body-anchored, messaging system, according to some examples FIG. 6 illustrated an alternative view as seen by a user wearing an AR device, consistent with some examples.

FIG. 5 illustrates a view as seen by a user wearing a head-wearable apparatus 116, such as augmented reality (AR) spectacles, when interacting with a quick-access, or body-anchored, messaging system. The figure depicts an arm 500 of the user, upon which a user interface 502 is displayed by the AR device. This user interface 502 is anchored to and dynamically tracks the user's arm, demonstrating the body-anchored interface functionality of the system.

To access this functionality, the user may need to invoke a messaging application or a friend feed feature on the AR device. This can be done through various input methods, such as voice commands (e.g., "Open messaging app"), predefined hand gestures (e.g., tapping the side of the AR spectacles), or by selecting an icon in the AR device's main menu using eye-tracking technology. In some examples, the AR device may be configured to automatically display the user interface 502 upon detecting a body part in an image or series of images.

Once activated, the AR device uses its camera system to capture and process image data, detecting and tracking the user's arm. The system then anchors the user interface 502 to the detected arm or other body part, ensuring it remains in a consistent position relative to the user's body as they move.

The user interface 502 comprises several user interface elements, each representing either an individual social connection or a group of social connections. For instance, element 504 represents a group labeled "Besties". Elements 506 and 508 represent individual social connections, labeled "Todd M." and "Vika" respectively. These elements may be arranged based on factors such as communication frequency or user-defined priorities.

Adjacent to element 504 is an indicator 504-A, which signifies that this element can be "pinned" to appear at the top of the user interface. This pinning functionality allows users to prioritize certain connections or groups for quick access. Users can interact with this indicator through various input methods, such as tapping it with their other hand (detected by the AR device's cameras), using a voice command (e.g., "Pin Besties"), or focusing their gaze on the indicator for a predetermined duration.

Elements 504-B and 506-B are icons or indicators representing microphones. When selected, these icons activate the microphone of the head-wearable apparatus 116, enabling the user to record and send an audio message to the associated social connection or group. This functionality operates similarly to a walkie-talkie, allowing for quick, hands-free communication.

The body-anchored interface supports various gesture-based interactions for selecting and manipulating user interface elements. For example, the user may perform a "tap" gesture in mid-air near the displayed user interface element to select it. The AR device's cameras detect this gesture and interpret it as a selection. Additionally, the system supports "swipe" gestures to scroll through a list of contacts or messages, and "pinch" gestures to zoom in or out of the interface. These gesture-based interactions provide an intuitive and natural way for users to interact with the body-anchored interface, enhancing the overall user experience.

Users can select these microphone icons through various interaction methods:

Hand gestures: The user can "tap" the icon in mid-air, with the AR device's cameras detecting the gesture.

Voice commands: The user can say "Message Besties" or "Call Todd" to activate the corresponding microphone.

Eye-tracking: The user can focus their gaze on the microphone icon for a set duration to activate it.

Head movements: Subtle head nods or shakes could be used to navigate and select icons.

In the illustrated example, the microphone icon 504-B associated with the "Besties" group is shown in an activated state. This visual cue indicates that the user can immediately begin recording or streaming an audio message that will be sent to all members of the "Besties" group. The user might hold down a physical button on the AR spectacles while speaking to record the message, or use a voice command like "Start recording" and "Send message" to control the recording or live streaming process.

When activated, the audio captured by the microphone is communicated over a network to the device(s) of one or more users. This communication can occur in different modes:

Real-time conversation: Similar to a telephone or walkie-talkie, the system allows for immediate, synchronous communication between users. This enables direct, live conversations through the AR interface. In some examples, this may work with a live video stream of one or both participants.

Asynchronous communication: In certain scenarios, the system provides for asynchronous messaging. This means that messages can be recorded and sent even when the recipient is not actively engaged in communication at that time. In such cases, the audio message is stored and made available to the recipient the next time they activate their messaging application. In some examples, an audio message may be processed using audio-to-text technology, and communicated to a message recipient as a text message.

Consistent with some examples, the system supports various communication scenarios:

AR-to-AR communication: In some cases, the system facilitates real-time communications between two or more users who are both wearing AR devices. In this scenario, all participants would see user interfaces projected onto their bodies, creating a shared AR communication experience.

AR-to-conventional device communication: The AR device can also communicate messages to end-users who are using conventional or traditional devices such as mobile phones, computers, laptops, or tablet computers. This cross-platform capability ensures that AR users can communicate seamlessly with contacts regardless of the recipient's device type.

Each user interface element, such as 504, 506, and 508, may be presented with an indicator or icon to represent the status or availability of the social connection it represents. This indicator could take various forms, such as a color-coded dot, an icon, or a textual status. For example, a green dot might indicate that the user is online and available, a yellow dot could signify that they are idle or away, and a red dot might show that they are busy or do not wish to be disturbed. This visual cue allows the AR device wearer to quickly assess which of their contacts are available for immediate communication.

In addition to the availability status, each user interface element may also include a visual representation indicating the nature or type of device the social connection is currently using. This could be depicted through small icons or symbols associated with each element. For instance, an AR headset icon might indicate that the contact is using an AR device, a smartphone icon could represent a mobile user, and a computer icon might signify a desktop or laptop user. This information is particularly valuable as it informs the AR device wearer about the communication capabilities of their potential message recipients. It allows the user to know whether a real-time voice communication session is possible (e.g., if the recipient is using an AR device or a smartphone), or if a recorded message will be more appropriate (e.g., if the recipient is offline or using a device without real-time communication capabilities). This feature enhances the user's ability to choose the most effective mode of communication for each interaction, improving the overall efficiency and effectiveness of their communications through the AR interface.

This flexibility in communication modes and device compatibility enhances the utility of the body-anchored interface, allowing users to engage in both immediate and delayed communications across various platforms and devices.

While FIG. 5 illustrates the user interface anchored to the user's arm, it's important to note that the system is designed with flexibility to accommodate various body locations. The body-anchored interface can be presented on other body parts, including the hand, leg, torso, or any other suitable area detected by the AR device's cameras. This adaptability allows users to choose the most comfortable and convenient location based on their preferences or current activity.

The number of user interface elements representing social connections presented in the body-anchored interface can be determined through various methods, offering a high degree of customization:

- Available space: The system may automatically adjust the number of elements based on the observed space available on the chosen body part. For instance, a larger surface area like the forearm might accommodate more elements compared to the back of the hand.
- User configuration: The application can be configured to display a predetermined number of user interface elements based on user preferences. This allows users to control the density of information presented, balancing between quick access to multiple contacts and a cleaner, less cluttered interface.
- Automatic selection: The system can dynamically select which user interface elements to display based on various relationship attributes. This intelligent selection process considers multiple factors:
  - a. Strength of connection: The system may prioritize displaying elements for social connections with whom the user has a stronger relationship, as determined by interaction patterns and explicit user designations.
  - b. Communication frequency: Contacts with whom the user communicates more often may be given priority in the interface.
  - c. Recency of communication: The system may prioritize displaying elements for contacts with whom the user has recently interacted.
  - d. Activity status: Social connections who are currently active or online may be given prominence in the interface.
  - e. Physical proximity: If location data is available, the system might prioritize displaying elements for contacts who are physically closer to the user.

The automatic selection process employs sophisticated algorithms that weigh these various factors to determine the most relevant social connections to display. For example, the system might use a scoring system that combines these attributes, assigning higher scores to contacts who have a strong connection strength, frequent recent communications, and are currently active. The top-scoring contacts would then be displayed in the body-anchored interface.

Furthermore, the system can dynamically update the displayed elements based on changing conditions. For instance, if a previously inactive contact becomes active, their corresponding user interface element might appear or move to a more prominent position. Similarly, as communication patterns change over time, the system can adjust the displayed elements to reflect the user's evolving social network.

This adaptive and context-aware approach to presenting user interface elements ensures that the body-anchored interface remains relevant and useful to the user at all times, providing quick access to the most pertinent social connections based on a comprehensive analysis of the user's communication patterns and preferences.

The body-anchored interface employs adaptive positioning to ensure optimal visibility and interaction based on the user's current activity and environment. This adaptive positioning is achieved through continuous analysis of the user's movement patterns and environmental factors captured by the AR device's sensors, ensuring that the interface remains accessible and functional in various scenarios.

The application may be invoked simply by the user bringing their hand forward, such that their forearm is detected by the AR device's cameras. Upon detecting the forearm, the system may automatically present the user interface 502. In alternative embodiments, the application may be invoked in response to a combination of inputs. For example, it may require an audible command in conjunction with the camera detecting a specific body part to trigger the presentation of the user interface.

The system continuously tracks particular body parts using computer vision algorithms and only displays the user interface when the specified body part is detected. This ensures that the interface is not constantly visible, potentially causing distraction, but is readily available when needed. For instance, if the user is walking, the interface may automatically shift to a more stable position on the body, such as the forearm, to minimize movement. In situations where the user's arms are occupied, the interface can relocate to the user's torso or leg.

Consistent with some examples, users can configure the system to display different combinations of user interface elements on different body parts. By way of example, the end-user may configure the AR device to present a first subset of friends on their right forearm, while configuring the AR device to present a second and different subset of friends, or co-workers, on their left forearm. This customization allows for efficient organization and access to different social groups or categories of contacts. Of course, different combinations of friends may be grouped for presentation on various body parts, such as the upper arm, wrist, or even the palm of the hand, depending on user preference and the specific use case.

The continuous tracking and adaptive positioning of the interface ensure that it remains accessible and functional across various scenarios, adapting to the user's activities and environment. This dynamic approach to interface presentation enhances the usability and practicality of the AR messaging system, allowing for seamless integration into the user's daily life.

This body-anchored interface, as depicted in FIG. 5, demonstrates the system's capability to provide quick, intuitive access to messaging functions within an AR environment. By anchoring the interface to the user's arm and incorporating easily recognizable icons for group chats and voice messaging, the system offers a seamless and efficient communication experience tailored to the unique capabilities of AR devices. The walkie-talkie-like functionality allows for rapid, hands-free communication, making it particularly useful in situations where the user's hands may be occupied or when quick messages need to be sent.

Figure 6:
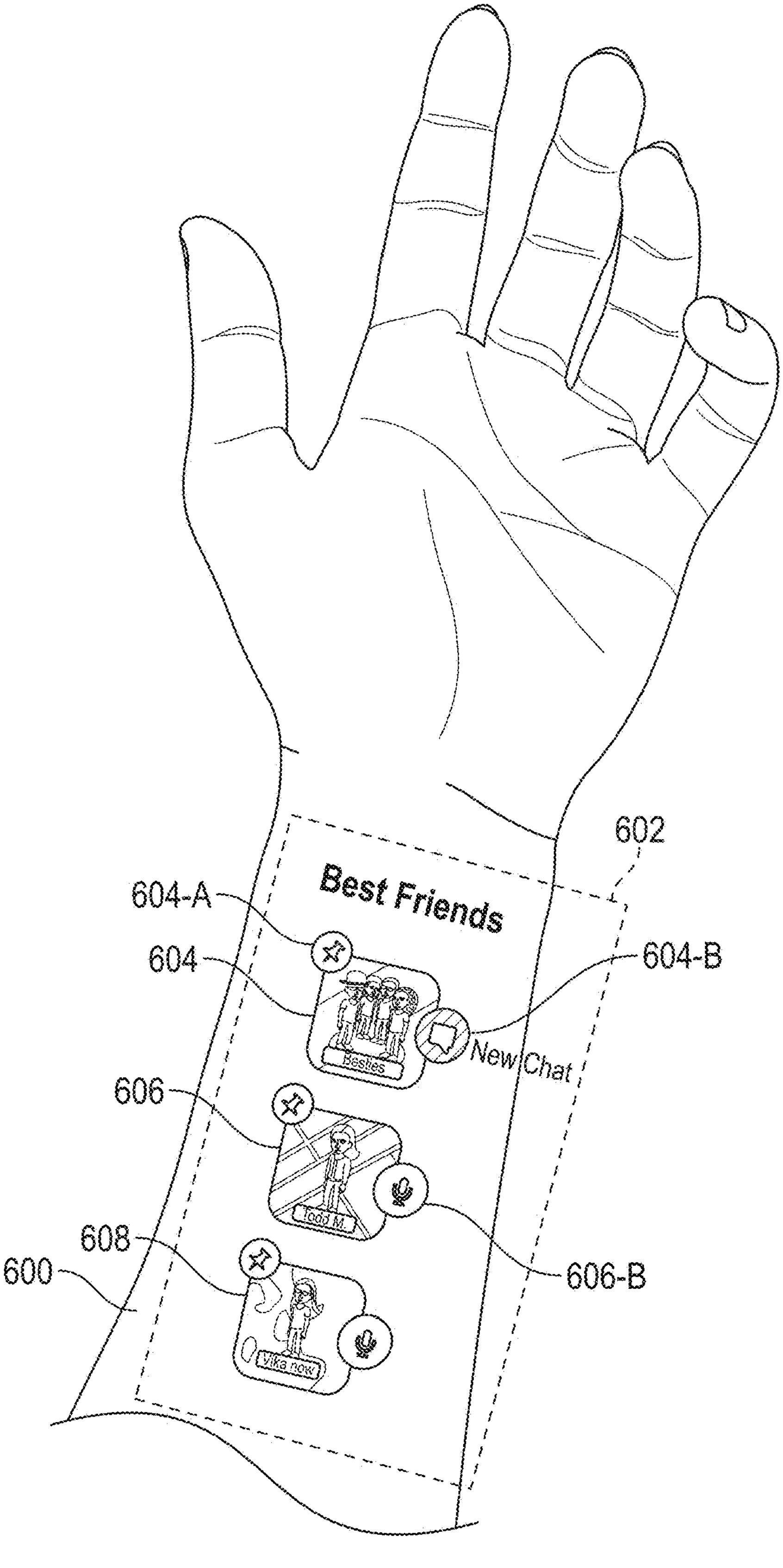

FIG. 6 illustrates an alternative view similar to that shown in FIG. 5. The primary difference to note is the icon with reference number 604-B, which now indicates that a new chat has been activated and one or more messages from the group "Besties" are available for viewing.

The user interface in this body-anchored AR system can be dynamically updated in real-time based on a combination of changing relationship attributes between the viewing user and each social connection. These updates reflect ongoing engagements with the online application and the messaging application in particular.

As new messages are received, delivered, and read, the user interface is dynamically updated to reflect the changing status of these messages. For example:

- Message indicators: When a new message is received from a social connection, their corresponding user interface element (e.g., 604, 606, 608) may display a notification icon or change color to indicate unread messages.
- Message preview: For recent messages, a preview of the message content might appear alongside the user interface element, allowing the user to quickly assess the message's importance without opening the full conversation.
- Read receipts: As messages are read by recipients, the interface may update to show read status, potentially using small icons or color changes to indicate which messages have been seen.
- Typing indicators: If a social connection is actively typing a message, a dynamic indicator (such as animated dots) might appear next to their user interface element.
- Presence updates: The availability status of social connections can be updated in real-time, with changes reflected through color-coded indicators or icons as users come online, go offline, or change their status.
- Interaction frequency: The size or position of user interface elements may dynamically adjust based on recent interaction frequency, giving more prominence to frequently contacted connections.
- Contextual information: The interface may update to show contextual information relevant to ongoing conversations, such as shared media, links, or location data.

These dynamic updates ensure that the AR interface provides a real-time, contextually relevant view of the user's social connections and messaging activity. By continuously refreshing the display based on current data and user interactions, the system maintains an up-to-date and highly responsive user experience tailored to the unique capabilities of AR devices.

Figure 7:
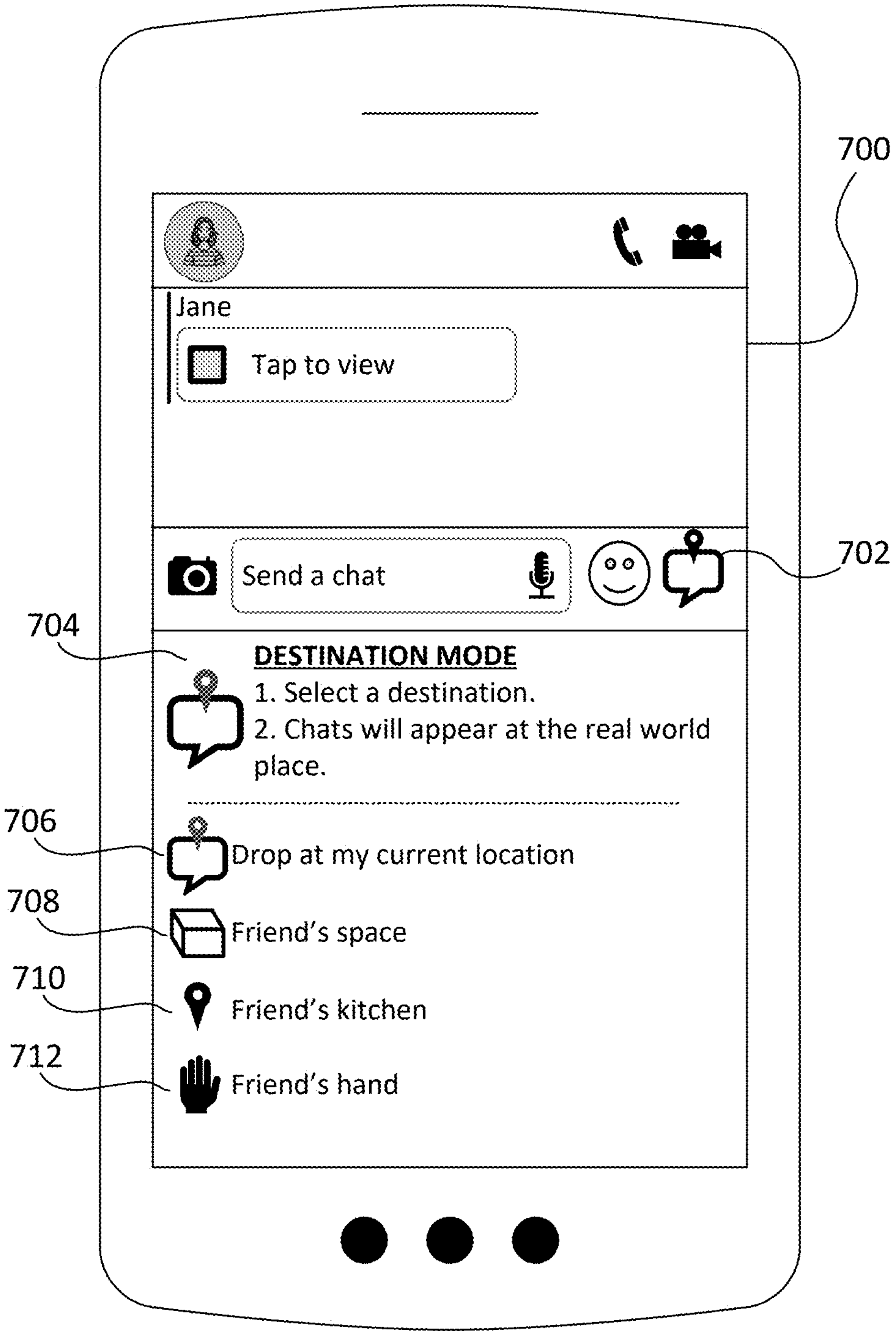
FIG. 7 illustrates a user interface 700 for a chat application as presented on a conventional mobile phone, consistent with some examples.

FIG. 7 illustrates a user interface 700 for a chat application as presented on a conventional mobile phone, consistent with some examples. This example user interface includes a user interface element 702 that allows the end user to create and send a message in "destination mode" 704. In destination mode, the message sender can select a specific destination where the message recipient will receive and view the message.

The user interface presents several options for sending a message to another end-user, Jane in this example. Icons 706, 708, and 710 represent options for leaving a message at the sender's current location, sending a message to the recipient's designated personal space, and sending to a specific room or location like a friend's kitchen, respectively. These options leverage various location-based and context-aware technologies to deliver messages in relevant physical or virtual spaces.

Of particular interest is icon 712, which allows the message sender to specify that the message should only be viewable when the recipient is looking at a particular object, such as their hand, arm, or other body parts. This feature significantly enhances the contextual and immersive nature of messaging in augmented reality (AR) environments.

When a sender selects icon 712 and chooses to associate a message with the recipient's hand, the system employs sophisticated technologies to ensure precise and context-aware message delivery. The message content, along with detailed information about the target object (in this case, the hand), is securely stored on the server. This object data might include characteristics such as shape, color, and expected location (e.g., "user's left hand").

The recipient's AR device plays a role in this process. Its camera continuously captures images of the user's environment, processing them in real-time using advanced computer vision algorithms. These algorithms employ state-of-the-art object recognition techniques, potentially utilizing machine learning models trained on extensive datasets of body parts and objects.

When the system detects a hand in the captured images, it performs a detailed comparison against the object data associated with the pending message. This comparison involves analyzing various features such as shape, size, skin tone, and the characteristic structure of a human hand, including the presence and arrangement of fingers.

With some examples, the AR device also utilizes eye-tracking technology to determine where the user is looking within their field of view. This gaze tracking is essential for ensuring that the message is only revealed when the user is actively looking at their hand. When the system confirms both that the user is looking at their hand and that the observed hand matches the object associated with the message, it triggers the message display.

With some examples, the AR device then renders the message content in the user's field of view, anchoring it to the hand in 3D space. This could involve overlaying text, images, or even interactive 3D models onto or near the hand. The system may be configured to keep the message visible as long as the user continues to look at their hand, or it may persist in the AR environment for a specified duration, allowing for interaction with the content.

This hand-anchored messaging feature leverages the unique capabilities of AR devices to create a highly personalized and immersive communication experience. It allows for precise, object-specific message delivery that integrates seamlessly with the user's physical environment, enhancing the connection between digital communication and the real world. For instance, a user could leave a personal note "attached" to a friend's hand, creating unique and memorable messaging experiences that blur the line between digital and physical interactions.

The implementation of this feature demonstrates the sophisticated integration of various technologies, including computer vision, machine learning, eye-tracking, and AR rendering, to create a novel and engaging form of digital communication that is deeply rooted in the physical world and the user's immediate context.

Figure 8:
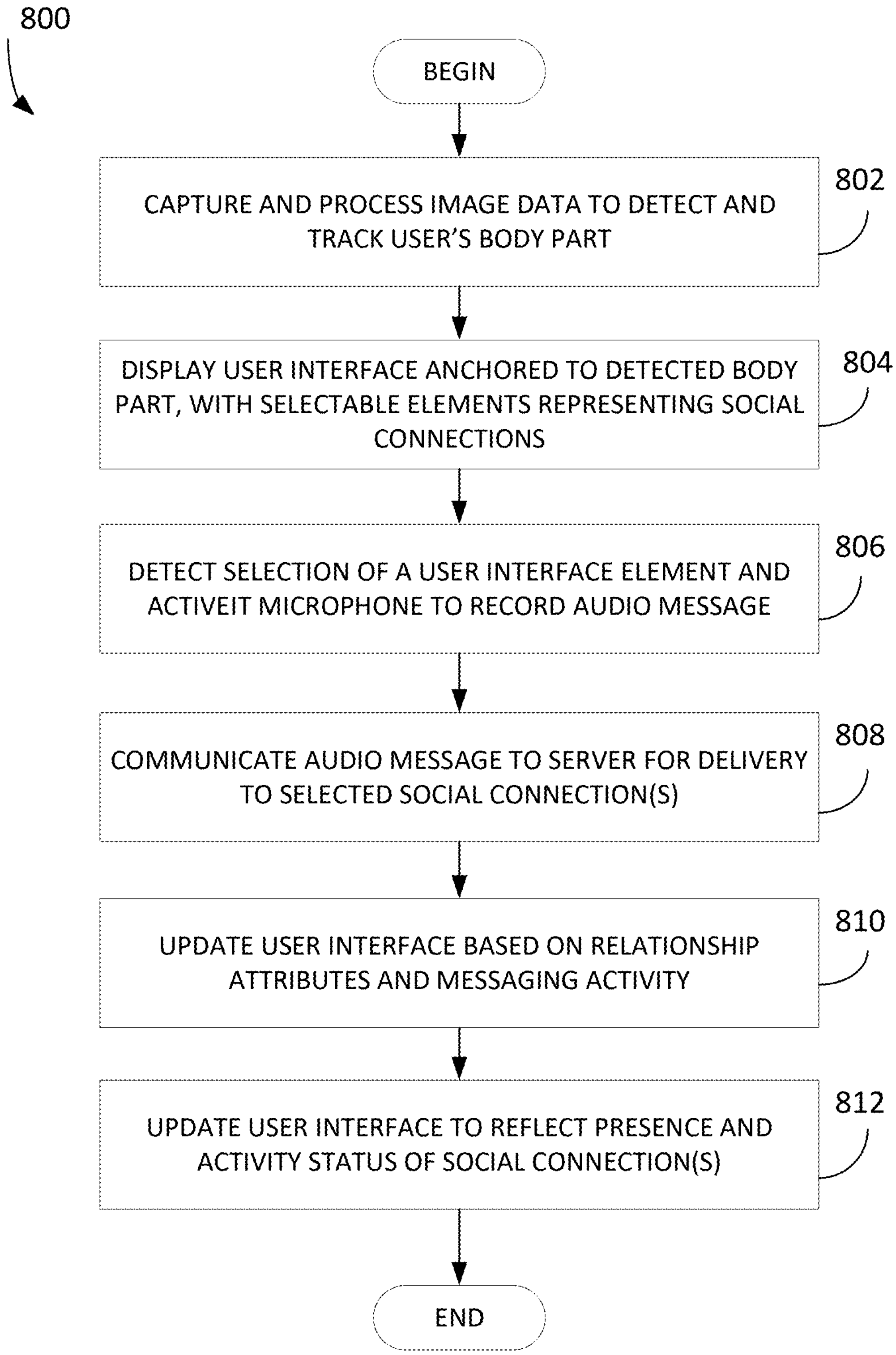
FIG. 8 illustrated a method as performed by an AR device, consistent with some examples.

As shown in FIG. 8, at the method operation with reference number 802, the AR device captures and processes image data using the camera(s) of the head-wearable apparatus 116. This image data is then processed using computer vision algorithms to detect and track a specific body part of the user wearing the device. The detection and tracking can be performed through continuous scanning, gesture-triggered scanning, or voice-activated scanning, utilizing techniques such as skeletal tracking, contour analysis, or machine learning-based object detection.

At operation 804, once a body part is detected and tracked, the system displays a user interface anchored to this body part. The user interface comprises multiple user interface elements, each representing a social connection or a group of social connections. The system determines which elements to display based on factors such as available space, user configuration, or automatic selection algorithms. These elements may include additional visual cues like status indicators, device type indicators, and unread message indicators.

Operation 806 involves the system continuously monitoring for user input to detect the selection of a user interface element. This detection can occur through various methods, including gesture recognition, gaze tracking, voice commands, or physical button presses. Upon detecting a selection, the system activates the microphone of the head-wearable apparatus 116 to record an audio message. The activation may be indicated by a visual cue, such as changing the color of the microphone icon associated with the selected element. During recording, the system may provide additional features like real-time transcription, background noise cancellation, or voice modulation.

At operation 808, once the audio message is recorded, the system communicates it to a server via the network interface for delivery to the device(s) of the selected social connection (s). This communication process may involve encryption, compression, and metadata attachment. The system may offer different delivery options, including real-time delivery, scheduled delivery, or conditional delivery.

Operation 810 involves the system continuously updating the user interface to reflect changes in relationship attributes and messaging activity. This may include reordering elements, resizing elements, updating status indicators, or displaying message previews. The update process considers various factors such as time-based decay, contextual relevance, and mutual interaction patterns.

Finally, at operation 812, the system regularly updates the user interface to show the current presence and activity status of the user's social connections. This may involve updating color-coded status indicators, displaying or updating device type icons, showing "typing" indicators, or displaying contextual information. The system may obtain this information through regular polling of the server, real-time push notifications, or direct peer-to-peer communication with contacts who are also using AR devices.

These detailed operations ensure that the body-anchored interface provides a dynamic, context-aware, and user-friendly communication experience, fully leveraging the capabilities of AR technology.

System with Head-Wearable Apparatus

Figure 9:
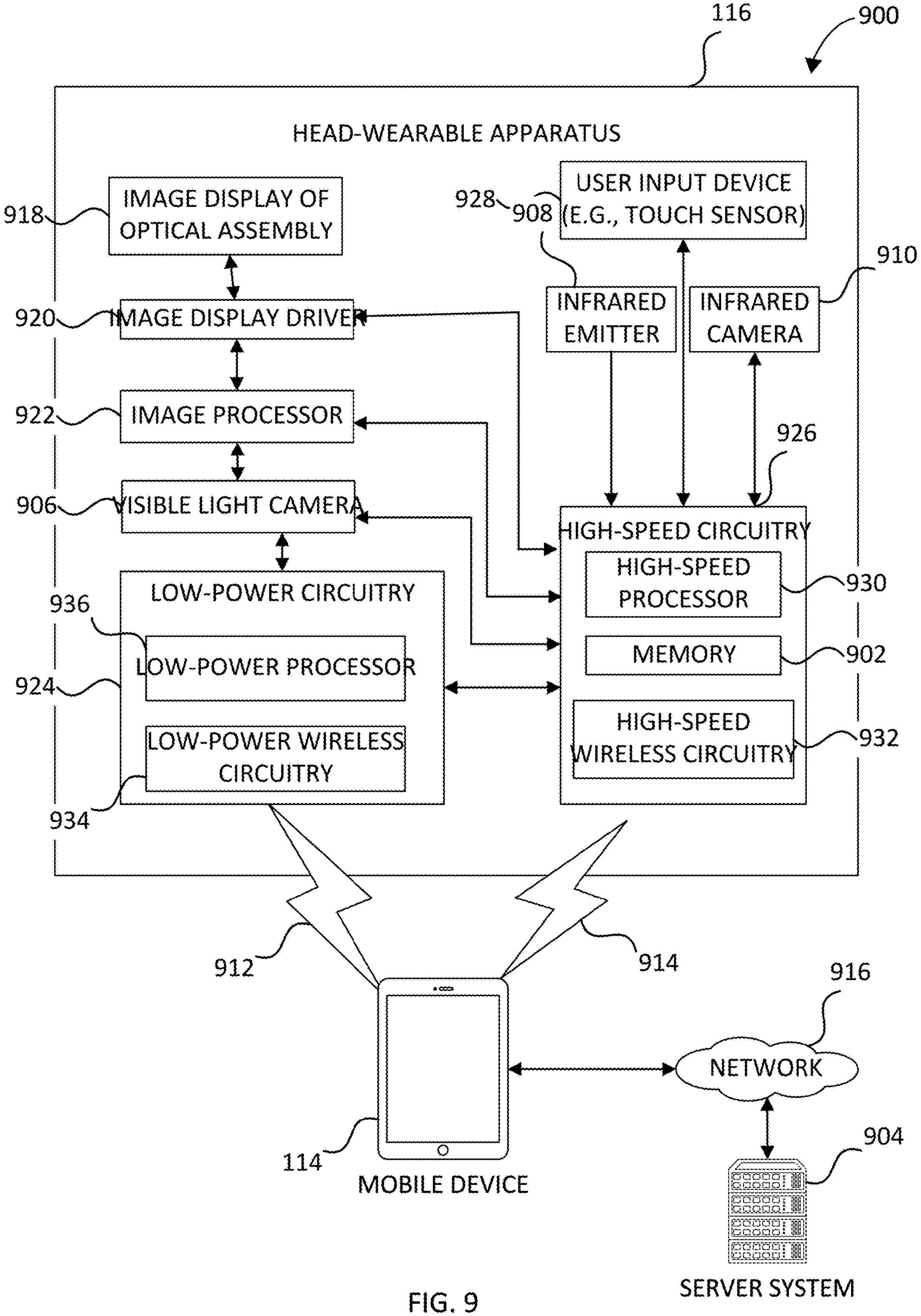
FIG. 9 illustrates a system in which the head-wearable apparatus, according to some examples.

FIG. 9 illustrates a system 900 including a head-wearable apparatus 116 with a selector input device, according to some examples. FIG. 9 is a high-level functional block diagram of an example head-wearable apparatus 116 communicatively coupled to a mobile device 114 and various server systems 904 (e.g., the server system 110) via various networks 108.

The head-wearable apparatus 116 includes one or more cameras, each of which may be, for example, a visible light camera 906, an infrared emitter 908, and an infrared camera 910.

The mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that can include a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 906 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset, or all the functions described herein. The memory 902 can also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN) using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WI-FI®. In some examples, other high-speed communications standards may be implemented by the high-speed wireless circuitry 932.

The low-power wireless circuitry 934 and the high-speed wireless circuitry 932 of the head-wearable apparatus 116 can include short-range transceivers (e.g., Bluetooth™, Bluetooth LE, Zigbee, ANT+) and wireless wide, local, or wide area network transceivers (e.g., cellular or WI-FI®). Mobile device 114, including the transceivers communicating via the low-power wireless connection 912 and the high-speed wireless connection 914, may be implemented using details of the architecture of the head-wearable apparatus 116, as can other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 can be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include sensors and display elements integrated with the head-wearable apparatus 116. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 912 and high-speed wireless connection 914 from the mobile device 114 via the low-power wireless circuitry 934 or high-speed wireless circuitry 932.

Machine Architecture

Figure 10:
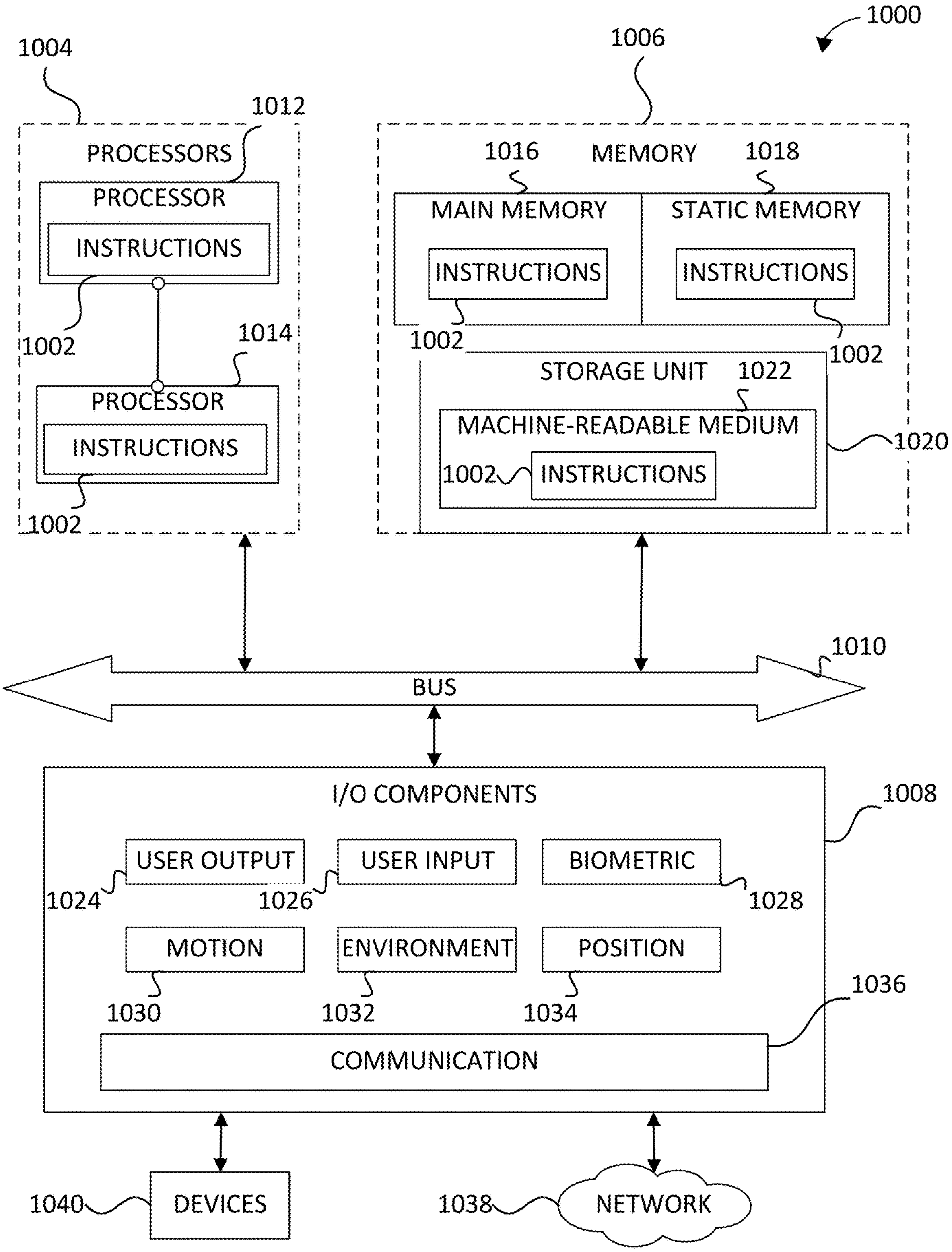
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine

1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the server system 110. In some examples, the machine 1000 may also comprise both client and server systems, with certain operations of a particular method or algorithm being performed on the server-side and with certain operations of the method or algorithm being performed on the client-side.

The machine 1000 may include processors 1004, memory 1006, and input/output I/O components 1008, which may be configured to communicate with each other via a bus 1010.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
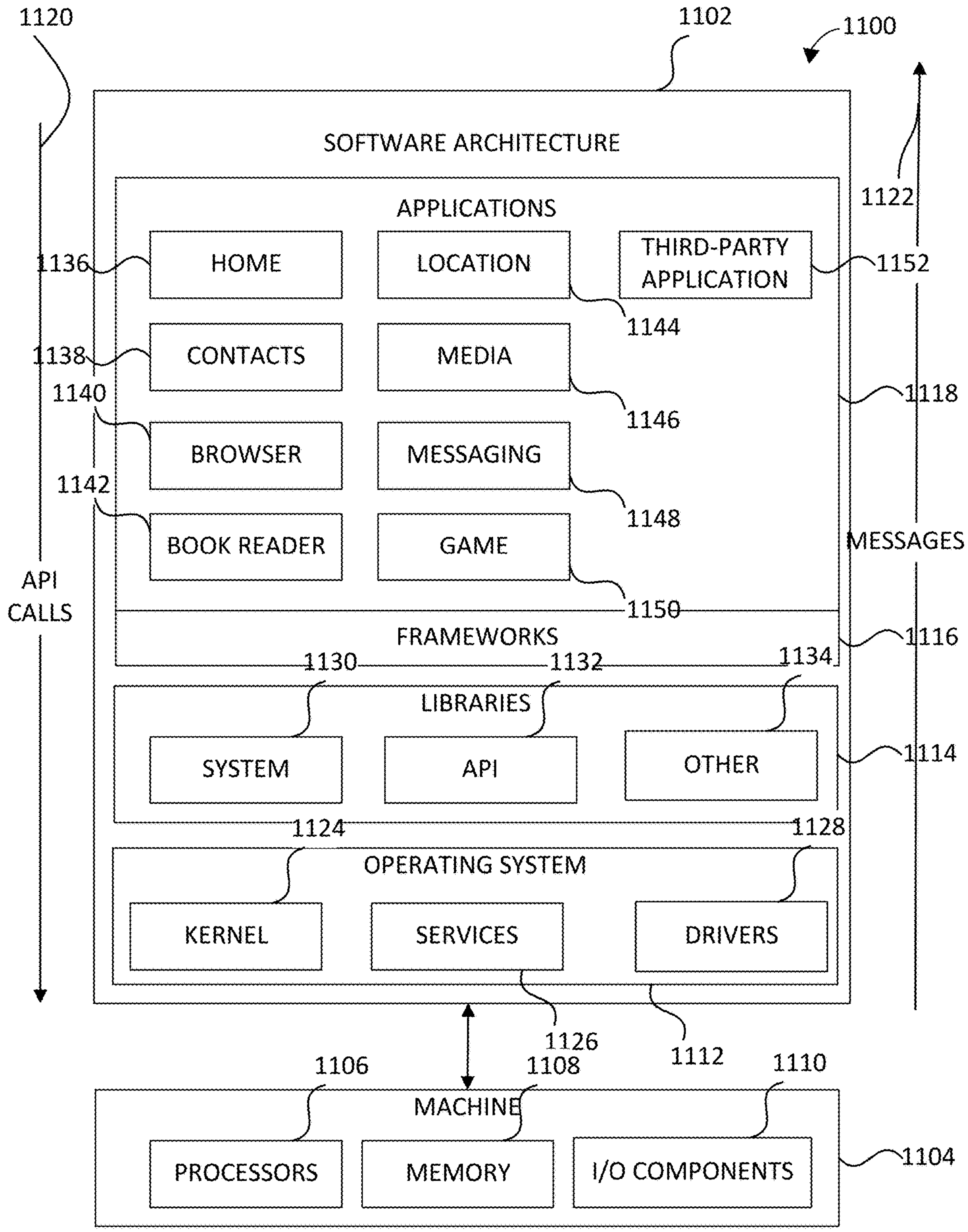
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematical functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLE STATEMENTS

Example 1 is a device for presenting a user interface of a messaging application in augmented reality ("AR"), the device comprising: at least one processor; at least one camera; a display; a microphone; a network interface; and memory storing instructions that, when executed by the at least one processor, cause the device to perform operations comprising: capturing, via the at least one camera, image data; processing the image data to detect a body part of a person wearing the device; dynamically tracking the detected body part while displaying in AR space, via the display, a user interface anchored to the detected body part, the user interface comprising a plurality of user interface elements, wherein a first user interface element represents a social connection or a group of social connections; detecting a selection of the first user interface element; in response to detecting the selection, activating the microphone to record an audio message; communicating, via the network interface, the audio message to a messaging service for delivery to a device of the social connection or to a device for each social connection in the group of social connections.

In Example 2, the subject matter of Example 1 includes, wherein the body part is a portion of an arm between a wrist and an elbow with a palm facing upward, and wherein the plurality of user interface elements are displayed in an order based on a relationship attribute.

In Example 3, the subject matter of Example 2 includes, wherein the relationship attribute is a social connection score indicating a strength of connection between a user of the device and the social connection represented by each user interface element, and wherein a user interface element appearing closest to the wrist has a highest social connection score.

In Example 4, the subject matter of Examples 2-3 includes, wherein the relationship attribute is based on recency of communications with each social connection represented by the user interface elements.

In Example 5, the subject matter of Examples 1-4 includes, wherein the operations further comprise updating the user interface in real-time to reflect changes in relationship attributes associated with the social connections.

In Example 6, the subject matter of Examples 1-5 includes, wherein the operations further comprise updating the user interface in real-time to reflect messaging activity, including messages received from a social connection and messages delivered to a social connection.

In Example 7, the subject matter of Examples 1-6 includes, wherein the operations further comprise updating the user interface to reflect a presence status of each social connection with respect to a messaging service.

In Example 8, the subject matter of Examples 1-7 includes, wherein the operations further comprise updating the user interface to reflect an activity status of each social connection.

In Example 9, the subject matter of Examples 1-8 includes, wherein each user interface element is presented with an additional graphical element indicating a type of device being used by the corresponding social connection.

In Example 10, the subject matter of Examples 1-9 includes, wherein at least one user interface element comprises an avatar configured by the social connection represented by the user interface element.

Example 11 is a method for presenting a user interface of a messaging application in augmented reality ("AR") by a wearable AR device, the method comprising: capturing, via at least one camera, image data; processing the image data to detect a body part of a person wearing the AR device; dynamically tracking the detected body part while displaying in AR space, via a display of the AR device, a user interface anchored to the detected body part, the user interface comprising a plurality of user interface elements, wherein a first user interface element represents a social connection or a group of social connections; detecting a selection of the first user interface element; in response to detecting the selection, activating the microphone to record an audio message; communicating, via a network interface, the audio message to a messaging service for delivery to a device of the social connection or to a device for each social connection in the group of social connections.

In Example 12, the subject matter of Example 11 includes, wherein the body part is a portion of an arm between a wrist and an elbow with a palm facing upward, and wherein the plurality of user interface elements are displayed in an order based on a relationship attribute.

In Example 13, the subject matter of Example 12 includes, wherein the relationship attribute is a social connection score indicating a strength of connection between a user of the device and the social connection represented by each user interface element, and wherein a user interface element appearing closest to the wrist has a highest social connection score.

In Example 14, the subject matter of Examples 12-13 includes, wherein the relationship attribute is based on recency of communications with each social connection represented by the user interface elements.

In Example 15, the subject matter of Examples 11-14 includes, wherein the operations further comprise updating the user interface in real-time to reflect changes in relationship attributes associated with the social connections.

In Example 16, the subject matter of Examples 11-15 includes, wherein the operations further comprise updating the user interface in real-time to reflect messaging activity, including messages received from a social connection and messages delivered to a social connection.

In Example 17, the subject matter of Examples 11-16 includes, wherein the operations further comprise updating the user interface to reflect a presence status of each social connection with respect to a messaging service.

In Example 18, the subject matter of Examples 11-17 includes, wherein the operations further comprise updating the user interface to reflect an activity status of each social connection.

In Example 19, the subject matter of Examples 11-18 includes, wherein each user interface element is presented with an additional graphical element indicating a type of device being used by the corresponding social connection.

Example 20 is a device for presenting a user interface of a messaging application in augmented reality ("AR"), the device comprising: means for capturing image data; means for processing the image data to detect a body part of a person wearing the device; means for dynamically tracking the detected body part while displaying in AR space a user interface anchored to the detected body part, the user interface comprising a plurality of user interface elements, wherein a first user interface element represents a social connection or a group of social connections; means for detecting a selection of the first user interface element; means for activating the microphone to record an audio message in response to detecting the selection; means for communicating the audio message to a messaging service for delivery to a device of the social connection or to a device for each social connection in the group of social connections.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Definitions

"Carrier signal" may include, for example, any intangible medium that can store, encoding, or carrying instructions for execution by the machine and includes digital or analog communications signals or other intangible media to facilitate communication of such instructions. Instructions may be transmitted or received over a network using a transmission medium via a network interface device.

"Client device" may include, for example, any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" may include, for example, a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" may refer to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" may include, for example, both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" may include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine storage medium may also refer to cloud storage services, network attached storage (NAS), storage area networks (SAN), and object storage devices. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" may include, for example, a tangible medium that is capable of storing, encoding, or carrying the instructions for execution by a machine.

"Processor" may include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" may include multi-core processors that may comprise two or more independent processors (sometimes referred to as "cores") that may execute instructions contemporaneously. These cores can be homogeneous (e.g., all cores are identical, as in multicore CPUs) or heterogeneous (e.g., cores are not identical, as in many modern GPUs and some CPUs). In addition, the term "processor" may also encompass systems with a distributed architecture, where multiple processors are interconnected to perform tasks in a coordinated manner. This includes cluster computing, grid computing, and cloud computing infrastructures. Furthermore, the processor may be embedded in a device to control specific functions of that device, such as in an embedded system, or it may be part of a larger system, such as a server in a data center. The processor may also be virtualized in a software-defined infrastructure, where the processor's functions are emulated in software.

"Signal medium" may include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" may include, for example, a device accessed, controlled or owned by a user and with which the user interacts perform an action, engagement or interaction on the user device, including an interaction with other users or computer systems.

What is claimed is:

1. A device for presenting a user interface of a messaging application in augmented reality ("AR"), the device comprising:

at least one processor;

at least one camera;

a display;

a microphone;

a network interface;

and memory storing instructions that, when executed by the at least one processor, cause the device to perform operations comprising:

capturing, via the at least one camera, image data;

processing the image data to detect and identify a body part of a person wearing the device, the body part comprising at least one of:

an arm, a forearm, a leg, a torso, or a wrist;

selecting, based on the identified body part, a set of social connections from a plurality of social connections, wherein the identified body part is an arm and the set of social connections is selected based on a configuration setting indicating that social connections are to be presented on the arm;

dynamically tracking the detected body part while displaying in AR space, via the display, a user interface anchored to the detected body part, the user interface comprising a plurality of user interface elements corresponding to the set of social connections and displayed in an order based on a relationship attribute;

detecting a selection of a first user interface element associated with a first social connection in the set of social connections;

in response to detecting the selection, activating the microphone to record an audio message;

communicating, via the network interface, the audio message to a messaging service for delivery to a device of the first social connection.

2. The device of claim 1, wherein the relationship attribute is a social connection score indicating a strength of connection between a user of the device and the social connection represented by each user interface element, and wherein a user interface element appearing closest to the wrist has a highest social connection score.

3. The device of claim 1, wherein the relationship attribute is based on recency of communications with each social connection represented by the user interface elements.

4. The device of claim 1, wherein the operations further comprise updating the user interface in real-time to reflect changes in relationship attributes associated with the social connections.

5. The device of claim 1, wherein the operations further comprise updating the user interface in real-time to reflect messaging activity, including messages received from a social connection and messages delivered to a social connection.

6. The device of claim 1, wherein the operations further comprise updating the user interface to reflect a presence status of each social connection with respect to a messaging service.

7. The device of claim 1, wherein the operations further comprise updating the user interface to reflect an activity status of each social connection.

8. The device of claim 1, wherein each user interface element is presented with an additional graphical element indicating a type of device being used by the corresponding social connection.

9. The device of claim 1, wherein at least one user interface element comprises an avatar configured by the social connection represented by the user interface element.

10. A method for presenting a user interface of a messaging application in augmented reality ("AR") by a wearable AR device, the method comprising:

capturing, via at least one camera, image data;

processing the image data to detect and identify a body part of a person wearing the AR device, the body part comprising at least one of:

an arm, a forearm, a leg, a torso, or a wrist;

selecting, based on the identified body part, a set of social connections from a plurality of social connections, wherein the identified body part is an arm and the set of social connections is selected based on a configuration setting indicating that social connections are to be presented on the arm;

dynamically tracking the detected body part while displaying in AR space, via a display of the AR device, a user interface anchored to the detected body part, the user interface comprising a plurality of user interface elements corresponding to the set of social connections, and displayed in an order based on a relationship attribute;

detecting a selection of a first user interface element associated with a first social connection in the set of social connections;

in response to detecting the selection, activating a microphone to record an audio message;

communicating, via a network interface, the audio message to a messaging service for delivery to a device of the social connection.

11. The method of claim 10, wherein the relationship attribute is a social connection score indicating a strength of connection between a user of the device and the social connection represented by each user interface element, and wherein a user interface element appearing closest to the wrist has a highest social connection score.

12. The method of claim 10, wherein the relationship attribute is based on recency of communications with each social connection represented by the user interface elements.

13. The method of claim 10, further comprising: updating the user interface in real-time to reflect changes in relationship attributes associated with the social connections.

14. The method of claim 10, further comprising: updating the user interface in real-time to reflect messaging activity, including messages received from a social connection and messages delivered to a social connection.

15. The method of claim 10, further comprising: updating the user interface to reflect a presence status of each social connection with respect to a messaging service.

16. The method of claim 10, further comprising: updating the user interface to reflect an activity status of each social connection.

17. The method of claim 10, wherein each user interface element is presented with an additional graphical element indicating a type of device being used by the corresponding social connection.

18. A device for presenting a user interface of a messaging application in augmented reality ("AR"), the device comprising:

means for capturing image data;

means for processing the image data to detect and identify a body part of a person wearing the device, the body part comprising at least one of:

an arm, a forearm, a leg, a torso, or a wrist;

selecting, based on the identified body part, a set of social connections from a plurality of social connections, wherein the identified body part is an arm and the set of social connections is selected based on a configuration setting indicating that social connections are to be presented on the arm;

means for dynamically tracking the detected body part while displaying in AR space a user interface anchored to the detected body part, the user interface comprising a plurality of user interface elements corresponding to the set of social connections and displayed in an order based on a relationship attribute;

means for detecting a selection of a first user interface element;

means for activating a microphone to record an audio message in response to detecting the selection;

means for communicating the audio message to a messaging service for delivery to a device of a social connection associated with the first user interface element.

* * * * *